May 28, 1968     B. BRAUN     3,385,553
MOLD FOR PRODUCING PLASTIC CANNULAE FOR
CONTINUOUS INTRAVENOUS INFUSION
Original Filed July 26, 1962

INVENTOR.
BERNHARD BRAUN
BY Burgess, Dinklage & Sprung
ATTORNEYS

3,385,553
MOLD FOR PRODUCING PLASTIC CANNULAE FOR CONTINUOUS INTRAVENOUS INFUSION
Bernhard Braun, 1 An der Trunkelucke, Melsungen, Germany
Original application July 26, 1962, Ser. No. 212,696. Divided and this application Dec. 2, 1966, Ser. No. 620,194
Claims priority, application Germany, July 29, 1961, B 63,451
2 Claims. (Cl. 249—142)

ABSTRACT OF THE DISCLOSURE

An injection mold for producing plastic cannulae is disclosed. The injection mold has a central channel having inner dimensions conforming to the outer dimensions of a plastic cannula. A wire of smaller diameter than the central channel is mounted coaxially in the channel and means are provided for applying tension to the wire.

---

This application is a division of application Ser. No. 212, 696 filed July 26, 1962.

The present invention relates to a mold for producing a therapeutic apparatus and has particular reference to an injection mold for producing devices adapted especially for the purpose of indefinite continuous introduction of fluids into the vascular system.

Although the device produced by the mold of the invention is intended mainly for use in connection with the introduction of fluids into the vascular system, it may obviously be used for other purposes, as for example, introduction of suitable sounds or catheters for examination of the interior of the heart.

Heretofore, for continuously infusing fluids into the blood veins of the body, metal cannulae which were maintained in the veins for an extended period of time have been used. The sharp pointed ends of the cannula, however, tended to irritate the blood vessel interior. This is not only objectionable but often dangerous in that a phlebitis is produced.

To obviate such disadvantage, it has been proposed to use plastic capillaries. One recent proposal consists in a device wherein the capillary is introduced in such a manner that the vein is pierced by a metal cannula having its tip or fore-end tapered and having an inside diameter of at least 2 mm. The cannula can contain in its bore a second cannula having a smaller diameter. The cannula is introduced into the vein after which a fine plastic cannula is introduced into the pierced blood vessel through the bore of the first cannula, if desired, after removal of the second inner cannula, and, finally, the outer metal cannula is withdrawn over the plastic cannula. The plastic cannula is provided at its outer end with a wing-shaped metal extension adapted for being fastened to the skin or the plastic cannula is otherwise fastened, and it is thereafter connected with an infusion liquid supply line.

Another prior proposal consists in a plastic cannula assembly formed in such a manner that cannula sections each having a length of about 60 mm. and formed from a hard plastic material, such as rigid poly-vinylchloride, are shrunk onto a metal cannula having a smaller diameter and being tapered at its tip or fore end in the conventional manner. The tapered or conical forward portion of the short plastic cannula extends to the rear end of the beveling of the pointed end of the metal cannula, whereby the pointed end of the metal cannula gradually assumes the full cross-section of the plastic cannula. The plastic cannula at its end opposite the pointed end is connected with a second metal cannula having a somewhat larger cross-section, being mounted thereon by means of a piece of shrunken tubing also made of plastic and which covers the rear section (Rochester Plastic Needle). Thus, this type of apparatus is provided with more or less short plastic cannula sections for the introduction of the fluid into the blood vessel, the sections being provided on a metal cannula and introduced with the metal cannula into the blood vessel when the vein is pierced. These sections remain in the puncture opening after the subsequent removal of the metal cannula. Alternatively, such plastic cannula sections are introduced through the bore of the metal cannula and remain inserted in the blood vessel after the metal cannula has been removed. In the latter device the injection passage produced by the metal cannula has a greater diameter than the plastic cannula and, consequently, there exists the danger of bleeding due to the fact that the size of the puncture necessary for the introduction of the apparatus is greater than that of the retained device. Further, because of the inevitable variations in the inner cross-section of the fine plastic capillaries (such variations occurring particularly after heat sterilization), it is repeatedly observed that, after introduction of the plastic cannula into the vein, the connection provided for engagement of the infusion tubing does not hold reliably so that the plastic capillaries come loose and pass into the blood stream, and even into the chamber of the heart, from which they can be removed only by serious surgery.

An object of the present invention is to provide a mold for producing an apparatus by which all of the disadvantages referred to above are entirely obviated.

Another object of the present invention is to provide a mold for producing an apparatus which makes possible the installation of a plastic self-retaining cannula into a vein for continuous infusion of fluid into the vascular system.

Another object of the invention is to provide a mold for producing a form of cannula which, in addition to being an apparatus for introducing fluids into the vascular system, may also be used as a sheath for conducting a sound or catheter of proper form for the purpose of examining the interior of the heart.

Another object of the invention is to provide a mold for producing a form of cannula having means forming a part thereof for holding the apparatus firmly in position in the vein, which has been punctured.

Another object of the invention is to provide a form of apparatus adapted for use in manufacturing the therapeutic apparatus of the invention.

Still another object of the present invention is to provide a mold for improving the manufacture of plastic cannulae and parts thereof, more particularly to simplify, cheapen and speed-up such manufacture while at the same time increasing the reliability and accuracy of the device produced.

With these and other objects in view, the invention comprises various features hereinafter described.

The therapeutic device produced by the mold of the invention is particularly suitable for continuous intravenous infusions and comprises an inner metal cannula provided at the tip or fore-end with a tapered portion, a plastic cannula having a tapered tip or fore-end and a somewhat larger diameter adapted to receive and carry the metal cannula designed so as to accurately fit the cannula, and so as to tightly seal off the latter. The tapered or conical portion of the plastic cannula terminates at a point just short of the tapered section of the metal cannula tip in such a manner as to provide a smooth fit with the metal cannula and to avoid the formation of a perceptible shoulder, whereby the plastic cannula can be introduced into the blood vessel in an easy sliding manner together with the inner metal cannula. At the other end of the plastic cannula there is provided a reinforcement formed integrally with the plastic cannula proper, the reinforcement having on its free end a recess or opening adapted to receive a cone fitting, such as a Rekord cone and/or Luer cone. The reinforcement at the outermost end of the plastic cannula is preferably conical and on its exterior may be provided with a holding plate.

An advantage of the invention resides in that the plastic cannula is formed from a flexible physiologically-acceptable plastic material which neither on sterilization nor on extended contact with blood plasma or other fluids becomes brittle or undergoes any other deformation changes.

It is of essential importance to choose a suitable material for the construction of a plastic cannula. Rigid polyvinylchloride has been found not to be particularly suitable other than for the reasons already mentioned. Polyvinylchloride, as many other plastic materials, often contains plasticizers which are extracted on contact with the blood plasma. The plasticizers, on the one hand, are not always physiologically acceptable and, on the other hand, the mechanical properties of the plastic material are often changed due to the extraction of the plasticizers therefrom so that deformation, embrittling, tearing, etc., occur. It has been found, however, in accordance with the invention that polypropylene, as well as a mixture of high-pressure and low-pressure polyethylenes, as for example in a ratio of 85%:15%, is very satisfactory for forming the plastic cannula. A particularly suitable material is the product polypropylene KR1122 Badische Anilin- & Soda-Fabrik A.G. Ludwigshafen am Rhine, Germany.

The inside diameter of the plastic cannula of the invention can be so dimensioned as to permit the passage therethrough of a plastic sound or catheter having a smaller diameter and a correspondingly greater length and into the blood vessel, and from there into the auricle. With the aid of such a sound it is possible to introduce fluids directly into the auricle, such introduction being possible during installation of the device for carrying out a continuous intravenous infusion, which infusion can be temporarily interrupted for this purpose without any difficulty or need for the further installation of a second cannula.

The therapeutic apparatus of the invention is illustrated in its preferred form in the accompanying drawings, in which FIG. 1 is a longitudinal sectional view of a cannula assembly according to the invention;

Figure 1:
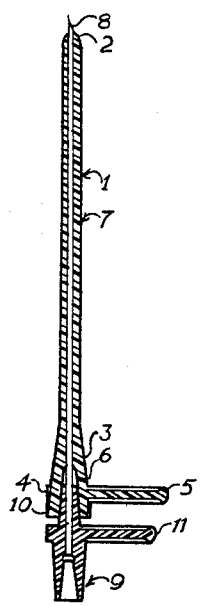
Figure 2:
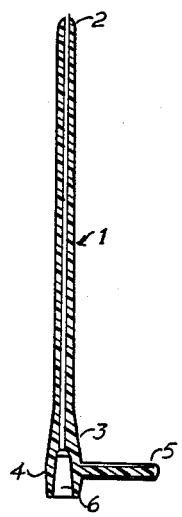
FIG. 2 is a longitudinal sectional view of the plastic cannula.

Referring more in detail to the drawings, the numeral 7 designates an inner metal mannula and 1 an outer plastic cannula which is adapted to fit accurately around the metal cannula so as to tightly seal it off. Preferably, the plastic cannula is made of polypropylene. However, other suitable flexible plastics may be used. The plastic cannula 1 has, at its tip or fore-end a taper or conical portion 2 (tapering inwardly to diminish the usual thickness) which is attached to the inner metal cannula 7 at the area of the inwardly tapered point 8 to produce a smooth fit with the metal cannula, i.e., without a shoulder being formed. As can be seen from the drawing, the conical or tapered surface terminates just short of the end of the metal point. At the opposite end of the plastic cannula 1 there is provided an outwardly tapering portion forming an integral conical reinforcement. The reinforcement 3 extends outwardly into a further expanded portion 4, the outer surface of which is preferably provided with grooves, serrations or otherwise roughened.

The reinforcement member 3 may be provided with a holding plate 5 at the expanded portion 4 thereof. The holding plate constitutes a means for securing the apparatus in fixed position until the infusion is completed. A similar holding plate 11 may be provided for the metal cannula. The plastic cannula 1 is also provided with a conical recess 6 adapted to receive the shoulder of a Rekord cone or a Luer cone.

Figure 3:
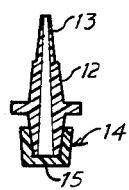
FIG. 3 is a longitudinal sectional view of a plastic stopper provided with a rubber cover.

The metal cannula is preferably provided with a stylet which is advantageously a rod or spring wire which is of sufficient diameter so as to be rigid (not shown). The inner metal cannula is provided with a plastic member 9 the outer cone of which is seated in the conical recess 6. The plastic stopper according to FIG. 3 comprises an outer cone 13 having a shoulder portion 12 and the rubber cover 14 with the reinforced portion 15.

The mold for making the plastic cannula or parts thereof is novel and is hereinafter described in more detail, reference being to the drawings and in particular to FIG. 4.

The plastic cannula component 1 is made by injection molding in which a mold 16 is used which is provided with a confined chamber or space which corresponds to the desired outer dimensions of the plastic cannula 1, the space carrying a core member 24. Upper and lower stop plates 20 and 21 are provided for the mold 16. In the center of these plates, bores 22 and 23 are provided. Bore 22 has a smaller diameter than bore 23, the diameter of the latter corresponding to that of the cylindrical portion of the metal core 24, the conical portion of which is formed so as to provide the recess 6 of the plastic cannula 1.

The core member 24 is provided with a longitudinal bore 17 in which a wire rod or like member 25 is positioned which corresponds to the inner dimensions of the plastic cannula 1. The arrangement and manipulation of this member 25 of a considerable importance to the successful carrying out of the method of the invention. The member 25 may be formed as a narrow rod, wire or needle, a hypodermic cannula being used to great advantage for forming this portion. As illustrated in FIG. 4, the wire, needle or cannula 25 is centrally secured or clamped into the core portion 24 while its upper end is centrally clamped by the clamping bolt 28 mounted in sleeve 27 which, in turn, is mounted in clamping plate 26. When clamping plate 26 is rotated in a given direction, the sleeve 27 will be moved upwardly and therewith the rod, wire or needle 25. In this manner tension is exerted on the member 25 acting to stretch the same, and preferably to its limit of stretchability. In this manner the relative flexibility of the narrow gauge member 25 in its longitudinal extension within the chamber or space 17 is substantially eliminated. As a result, the exact central positioning of the core member with an absolutely true linear direction within the space or chamber 17 is assured. This is important in order to safeguard against the displacement of the member 25 within the chamber or space 17 upon the sudden high pressure shock imparted thereto by the high pressure injection of molding material through the lateral bore 19 into the mold.

It is furthermore possible to manufacture 10 to 20 cannulae in one mold. In this case the clamping and stretching of the wires can be carried through automatically by clamping jaws.

A holding plate 31 supports metal core 24 in the needle holding plate 32 below stop plate 21. The core is situated on collar 33 in a corresponding recess in plate 32 and is thus held back against pull in the mold chamber.

The necessity for elimination of any displacement produced by the shock of the high-pressure injection of molding material has been found to be of great importance in maintaining the essential configuration of the injected plastic at the upper end of the injection molding space against the brass sleeve 29, which is provided at its lower end—i.e., end directed toward the center of the mold—with a lower cone portion 30. This cone portion 30 must correspond to an angular inclination with respect to the cone axis of from 20 to 40°, and preferably from 25 to 35°, with an optimum in most cases above 30° for average, uniformly, satisfactory results. It is important, in accordance with the invention, that the cone axis is substantially coincident with the axis of the bore of the plastic cannula as, otherwise, the cone angle would not be uniform on all sides with respect to the cylindrical portion of the plastic cannula. It is for this reason that the injection molding is carried out with the inner core member stabilized against displacement, such as by being maintained under tensile stress. This feature constitutes an essential element of the novel method of the invention.

There may be advantageously used as a central bore member 25 a metal rod, wire or cannula having a Rockwell hardness of about 60. The central core member 25 should be stretched, that is, maintained under such tension that it is substantially stabilized against lateral displacement along the suspended portion, i.e., between the terminating member or sleeve 29 and the metal core 24. This stabilization is to some extent also dependent on the length of the unsupported portion of member 25 in relation to its thickness and relative elasticity. It is, however, in all cases readily possible to ascertain for any desired gauge of the core member 25 the appropriate length and corresponding extensibility at which stabilization against lateral displacement and against impact shock from the injected molding material is realized. It is, in most cases, advantageous to apply sufficient stress to the core member 25 so that the maximum extension thereof is obtained.

It has been found that the stabilization against lateral displacement of the central core or wire 25 by means of the tensioning thereof is not only of great importance with respect to the positioning, and thus proper function, of the upper tapered or cone-like portion 30 of the injection molding device, but it is also essential in another respect. When stabilizing tension is not applied to the core or wire member 25, the injection molded plastic material tends to rupture or break in use intermediate the conical portion 2 and the outwardly tapering reinforcement portions 3 and 4. Unexpectedly, when the proper tension is applied to the core member 25, this difficulty no longer arises. The following example serves to illustrate the invention but are not intended in any way to be construed in limitation thereof:

EXAMPLE

Figure 4:
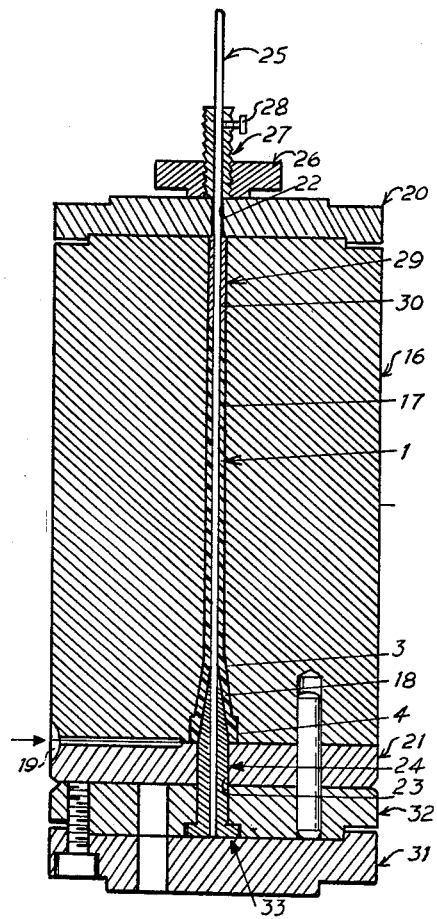
FIG. 4 is a sectional view of a mold preferably used for the production of a plastic cannula as shown in FIGS. 1 and 2.

An injection molding device as described in FIG. 4 is used. The longitudinal bore 17 has an inner cross-section of about 2 mm. A polished smooth steel wire having a cross-section of 1 mm. and a Rockwell hardness of 60 is clamped between the metal core member 24 and adapter sleeve 27 by way of a clamping bolt 28. The metal core 24 is constructed to provide the conical recess 6 and the cylindrical portion of the plastic cannula 1. The conical portion tapers outwardly from the cylindrical portion from the core member 24, the thickness being at first about 0.4 mm., becoming thereafter somewhat larger. The lower cone portion of brass sleeve 29 corresponds to an angle with respect to the cone axis of about 30°. Tension is applied by turning plate 26 in a direction whereby the threaded sleeve 27 (threading not shown) is caused to move upwardly, thereby tensioning the wire 25. A maximum strength (within the elasticity of the material) is applied, the same being about 20 kg./cm. By "maximum stretch" or "tension within the limits of elasticity" is to be understood such tension or stretch at which the material upon release of the tensioning force will return substantially to its original dimensions.

A polypropylene of the following characteristics is used:

| | |
|---|---|
| Melting range | 162–167° C. |
| Density | 0.905 gr./cm.$^3$. |
| Tensile strength | 280–320 kg./cm. |
| Elongation | 600–650%. |
| Shore hardness | 98/70. |
| Elasticity range | 10,000/cm.$^2$. |
| Molecular weight | About 400,000. |
| Shrinkage | 2–3%. |

The material is injected into the molding channel of the device in the conventional manner by way of the lateral bore 19 provided in the mold 16 at a temperature of about 230° C. and a pressure of about 1,000 atmospheres. The injection molding material is introduced into the bore 19 by either a conventional worm drive, pressure or piston type injection device, which is of known conventional construction. In accordance with conventional practice, the spacing of the terminal stops with respect to the side walls of the chamber to be filled by injection molding material is so arranged that the air within the chambers to be filled is displaced at the molding pressure while the molding material is retained therein.

Although the molding proceeding has been exemplified in accordance with the specific cannula devices herein illustrated, it will be readily understood that the injection molding technique as disclosed is more broadly applicable to the making of articles by injection molding requiring the provision of relatively narrow gauge bores in accurate alignment and wherein the use of a molding mandrel or a similar member of relatively thin gauge must be prevented from lateral displacement upon the impact shock of the molding material injected at high pressure.

The shoulder portion of the plastic cannula prevents the cannula from disengaging itself and from entering into the vascular system of the patient. Furthermore, the plastic cannula is formed of a material not producing irritation on prolonged insertion and which, additionally, is entirely stable. Additionally, in accordance with the invention, the manufacture of the plastic cannulae can be undertaken in an economically efficient manner. Due to the construction of the cannula of the particular plastic, it can be maintained in position in the vein for long periods since, in contrast to the heretofore employed rigid metal cannulae, it does not produce a mechanical irritation of the interior of the blood vessel. Additionally, there is the advantage that, when the cannula is in place, the supply of the infusion liquid can be interrupted by detaching the supply line and the cannula used for the introduction of a sound or catheter into the auricle. Alternatively, the cannula may be used for injection of other materials as, for example, otherwise required in the treatment of the patient's condition.

The plastic cannulae are highly flexible, are capable of repeated sterilization treatments, and serve to handicap the patient only slightly. A patient having such a cannula inserted in an arm vein can, for example, eat and drink using the arm. This, in itself, represents a great advantage over the infusion cannula heretofore available.

While in the embodiment shown, reinforcement 3 is formed integrally with cannula 1 by injection molding, it is, of course also possible to produce these two portions separately and to thereafter join them as by soldering, taking care only that the bond offers sufficient resistance and security and will not become loosened, deformed or become embrittled in use or in sterilization.

Although the invention has been described in its preferred form with a certain degree of particularity, it is understood that the present disclosure of the preferred form has been made by way of example and that numerous changes in the details of construction and the combination and arrangement of parts can be resorted to without departing from the spirit and scope of the invention.

Having thus set forth the nature of the invention what is claimed is:

1. An injection mold for producing plastic cannulae, said injection mold comprising a body portion having a central channel extending the length of said body portion with a conically enlarged portion at one end of the central channel, the dimensions of the central channel being substantially equal to the outer dimensions of a plastic cannula, end plates at the ends of the body portion having openings therein in line with said central channel, the opening in the end plate at the conically enlarged portion of the central channel being larger than the opening in the other end plate, a core mounted in the opening in the end plate having the larger opening and extending into the conically enlarged portion of the central channel, the outer dimensions of the portion of the core in the conically enlarged portion of the central channel being smaller than the corresponding inner dimensions of the conically enlarged portion, a wire having a smaller diameter than the inner cross sectional dimensions of the central channel anchored in the core and extending through the central channel and the opening in the end plate having the smaller opening, the diameter of the wire being substantially equal to the inner diameter of the plastic cannula, a sleeve having external threads mounted on the portion of the wire extending from the opening in the end plate having the smaller opening, means for clamping the sleeve to the wire, a clamping plate threaded onto the threads of the sleeve for applying tension to the wire, and a passage in the body portion of the injection mold for introducing molten plastic material into the said central channel.

2. An injection mold for producing plastic cannulae, said injection mold comprising a body portion having central channels extending the length of said body portion with conically enlarged portions at one end of the central channels, the dimensions of said central channels being substantially equal to the outer dimensions of a plastic cannula, end plates at the ends of the body portion having openings therein in line with said central channels, the opening in the end plate at the conically enlarged portion of the central channels being larger than the opening in the other end plate, a core mounted in the opening in the end plate having the larger opening and extending into the conically enlarged portion of the central channels, the outer dimensions of the portion of the core in the conically enlarged portion of the central channels being smaller than the corresponding inner dimensions of the conically enlarged portion, a wire having a smaller diameter than the inner cross sectional dimensions of the central channels anchored in the core and extending through the central channels and the opening in the end plate having the smaller opening, the diameter of the wire being substantially equal to the inner diameter of the plastic cannula, a sleeve having external threads mounted on the portion of the wire extending from the opening in the end plate having the smaller opening, means for clamping the sleeve to the wire, a clamping plate threaded onto the threads of the sleeve for applying tension to the wire, and a passage in the body portion of the injection mold for introducing molten plastic material into the said central channels.

References Cited

UNITED STATES PATENTS

| 760,191 | 5/1904 | Gaylord | 18—38 X |
|---|---|---|---|
| 1,387,292 | 8/1921 | Morse | 249—63 X |
| 2,152,738 | 4/1939 | Jeffery. | |
| 2,197,465 | 4/1940 | Brunetti. | |
| 2,363,508 | 11/1944 | Doster et al. | |
| 2,380,042 | 7/1945 | Houton. | |
| 2,418,823 | 4/1947 | Desimone | 249—79 X |
| 2,421,058 | 5/1947 | Eckstein. | |
| 2,602,191 | 7/1952 | Joy | 249—142 X |
| 2,946,093 | 7/1960 | Everett. | |
| 3,020,616 | 2/1962 | Marke | 249—175 X |
| 3,330,004 | 7/1967 | Cloyd et al. | |

J. HOWARD FLINT, JR., *Primary Examiner.*